United States Patent
Saito

(10) Patent No.: US 10,654,198 B2
(45) Date of Patent: May 19, 2020

(54) THREE-DIMENSIONAL IMAGE FORMING SYSTEM AND THREE-DIMENSIONAL IMAGE FORMING DEVICE

(71) Applicant: CASIO COMPUTER CO., LTD., Shibuya-ku, Tokyo (JP)

(72) Inventor: Minoru Saito, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 419 days.

(21) Appl. No.: 15/440,323

(22) Filed: Feb. 23, 2017

(65) Prior Publication Data

US 2017/0368721 A1    Dec. 28, 2017

(30) Foreign Application Priority Data

Jun. 24, 2016    (JP) .................. 2016-125588

(51) Int. Cl.
     *B29C 35/08*      (2006.01)
     *G05B 19/418*      (2006.01)
     (Continued)

(52) U.S. Cl.
     CPC ........ *B29C 35/0805* (2013.01); *B29C 35/002* (2013.01); *B29C 35/0272* (2013.01); *B29C 44/0407* (2013.01); *B29C 59/18* (2013.01); *B41M 5/0064* (2013.01); *B41M 5/0094* (2013.01); *G05B 19/41835* (2013.01); *B29C 2035/0822* (2013.01); *B29K 2101/12* (2013.01);
     (Continued)

(58) Field of Classification Search
     CPC ............ B29C 35/0805; B29C 44/0407; B29C 35/002; B29C 35/0272; B29C 59/18; B29C 2035/0822; G05B 19/41835; B29K 2101/12; B29K 2105/0076; B29K 2105/04; B29L 2007/002; B41M 5/0094; B41M 5/0064
     See application file for complete search history.

(56) References Cited

U.S. PATENT DOCUMENTS 8,870,327 B2    10/2014    Kanamura et al.
2003/0062118 A1*    4/2003    Gerhard .............. B29C 35/0272
                                                156/274.4
(Continued)

FOREIGN PATENT DOCUMENTS

JP      01234243 A    9/1989
JP      2003195669 A    7/2003
(Continued)

OTHER PUBLICATIONS

Japanese Office Action (and English language translation thereof) dated Jun. 26, 2018 issued in Japanese Application No. 2016-125588.

*Primary Examiner* — Michael M. Robinson
(74) *Attorney, Agent, or Firm* — Holtz, Holtz & Volek PC

(57) ABSTRACT

A three-dimensional image forming system according to the present invention includes a conveying unit which conveys a heat-expandable sheet along a conveyance path, a heating unit which heats the heat-expandable sheet by irradiating the heat-expandable sheet with light, and a control unit which preheats the surroundings of the heating unit to a previously determined preheat temperature and then causes the conveying unit to convey the heat-expandable sheet.

12 Claims, 5 Drawing Sheets

(51) Int. Cl.
*B41M 5/00* (2006.01)
*B29C 44/04* (2006.01)
*B29C 59/18* (2006.01)
*B29C 35/02* (2006.01)
*B29C 35/00* (2006.01)
*B29K 105/04* (2006.01)
*B29K 105/00* (2006.01)
*B29K 101/12* (2006.01)
*B29L 7/00* (2006.01)

(52) U.S. Cl.
CPC .. *B29K 2105/0076* (2013.01); *B29K 2105/04* (2013.01); *B29L 2007/002* (2013.01)

(56) References Cited

U.S. PATENT DOCUMENTS

| | | | | |
|---|---|---|---|---|
| 2007/0059010 A1* | 3/2007 | Arimoto | ............ | G03G 15/2017 399/69 |
| 2012/0218338 A1* | 8/2012 | Kanamura | ............... | B41J 3/407 347/15 |

FOREIGN PATENT DOCUMENTS

| | | | |
|---|---|---|---|
| JP | 5212504 | B2 | 6/2013 |
| JP | 2015205403 | A | 11/2015 |

* cited by examiner

THREE-DIMENSIONAL IMAGE FORMING SYSTEM AND THREE-DIMENSIONAL IMAGE FORMING DEVICE

BACKGROUND OF THE INVENTION

1. Field of the Invention

The present invention relates to a three-dimensional image forming system and a three-dimensional image forming device.

2. Background Art

Conventionally, there has been known a medium, which is referred to as "heat-expandable sheet," having an expansion layer, which expands according to an amount of absorbed heat, on one surface of the medium. In addition, there has been known a three-dimensional image forming system which forms a three-dimensional image by forming an electromagnetic wave-heat conversion layer, in which an electromagnetic wave is converted to heat, on the heat-expandable sheet by printing and then by expanding and raising the expansion layer in a portion where the electromagnetic wave-heat conversion layer is formed by irradiating the heat-expandable sheet with the electromagnetic wave (refer to Japanese Patent No. 5,212,504, for example).

A conventional three-dimensional image forming system has a structure in which the heat-expandable sheet is heated by irradiating the heat-expandable sheet with visible light and near infrared light by using a heating unit while conveying the heat-expandable sheet.

The conventional three-dimensional image forming system has a problem that it sometimes fails in stably forming a three-dimensional image having a desired expansion height as described below.

The expansion height of a three-dimensional image during forming the three-dimensional image varies depending on an environmental temperature. The conventional three-dimensional image forming system is not configured to change the control automatically according to an environmental temperature during forming a three-dimensional image. Therefore, the conventional three-dimensional image forming system is not able to stably form a three-dimensional image having a desired expansion height if the environmental temperature changes, thereby causing a variation in expansion height in some cases.

SUMMARY OF THE INVENTION

An object of the present invention is to stably form a three-dimensional image having a desired expansion height.

According to an aspect of the present invention, there is provided a three-dimensional image forming system including: a conveying unit which conveys a heat-expandable sheet along a conveyance path; a heating unit which heats the heat-expandable sheet by irradiating the heat-expandable sheet with light; and a control unit which preheats the surroundings of the heating unit to a previously determined preheat temperature and then causes the conveying unit to convey the heat-expandable sheet.

According to another aspect of the present invention, there is provided a three-dimensional image forming device including: a conveying unit which conveys a heat-expandable sheet along a conveyance path; a heating unit which heats the heat-expandable sheet by irradiating the heat-expandable sheet with light; and a control unit which preheats the surroundings of the heating unit to a previously determined preheat temperature and then causes the conveying unit to convey the heat-expandable sheet.

According to the present invention, a three-dimensional image having a desired expansion height is able to be formed stably.

DETAILED DESCRIPTION OF THE PREFERRED EMBODIMENT

Figure 1:
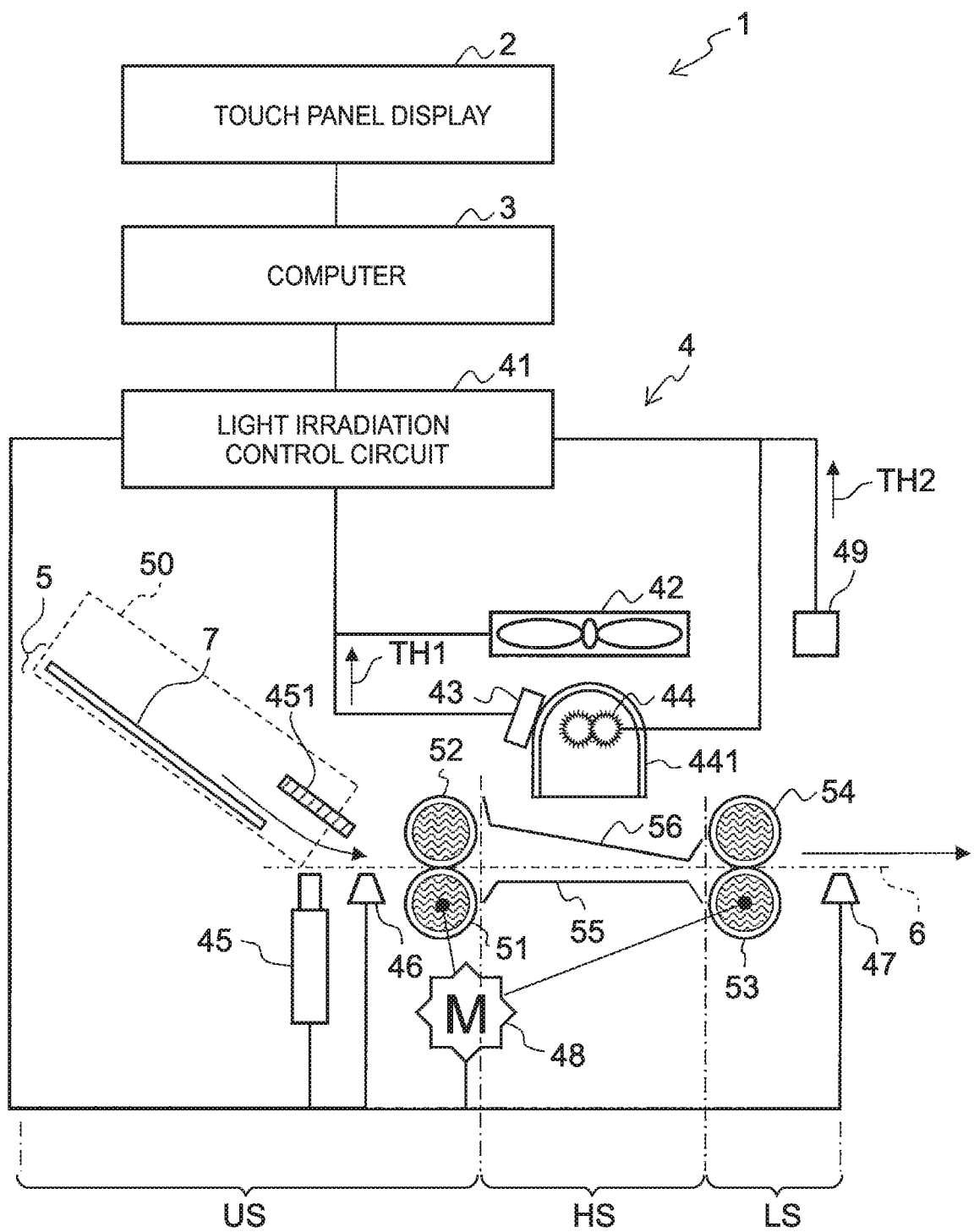
FIG. 1 is a schematic diagram showing the configuration of a three-dimensional image forming system according to an embodiment.

Modes for carrying out the present invention (hereinafter, referred to as "embodiments") will be described in detail below with reference to accompanying drawings. Note that each drawing is merely schematically shown enough to fully understand the invention. Thus, the present invention is not limited only to the illustrated examples. In each drawing, the same components or like components are denoted by the same reference numerals, and the explanation of those components will be omitted hereinafter.

The present invention is also intended to solve the following problems, for example.

(1) The expansion height during the formation of the three-dimensional image varies depending on an environmental temperature (room temperature). The conventional three-dimensional image forming system forms a three-dimensional image in a standard mode and thereafter causes an operator to visually confirm the expansion height of the three-dimensional image. Furthermore, if the expansion height is insufficient (if the expansion is too high or too low, for example), the conventional three-dimensional image forming system causes the operator to change the setting conditions and then forms the three-dimensional image in a nonstandard mode in which the setting conditions have been changed. In this conventional three-dimensional image forming system, it is necessary to form a three-dimensional image in an environment at a constant room temperature to prevent the operation of changing the setting conditions.

Therefore, in this embodiment, the present invention is also intended to provide a three-dimensional image forming system 1 which stably forms a three-dimensional image having a desired expansion height by changing the conveying speed of a heat-expandable sheet according to a room temperature so that the three-dimensional image is able to be formed even in an environment at a non-constant room temperature.

(2) Furthermore, in the formation of a three-dimensional image, preheat used during the formation of the previous three-dimensional image remains, and if the next three-dimensional image is formed in a state where the temperature of the surroundings of the heating unit is high, the three-dimensional image is likely to fail in acquiring a desired expansion height.

Therefore, in this embodiment, the present invention is also intended to provide a three-dimensional image forming system 1 which stably forms a three-dimensional image having a desired expansion height by detecting that the temperature of the surroundings of the heating unit is cooled down sufficiently without preheat remaining after the formation of the previous three-dimensional image and thereafter by forming the next three-dimensional image.

(Configuration of Three-Dimensional Image Forming System)

Hereinafter, the configuration of a three-dimensional image forming system 1 according to this embodiment will be described with reference to FIG. 1.

FIG. 1 is a schematic diagram showing the configuration of the three-dimensional image forming system 1.

As shown in FIG. 1, the three-dimensional image forming system 1 according to this embodiment includes a touch panel display 2, a computer 3, and a light irradiation unit 4.

The computer 3 includes a central processing unit (CPU), a random access memory (RAM), and a storage unit, which are not shown, to control the light irradiation unit 4.

The touch panel display 2 is formed of a combination of a liquid crystal display panel and a touch panel and is used for the handling of the computer 3.

The light irradiation unit 4 is a unit which irradiates a heat-expandable sheet 7 with visible light and near infrared light while conveying the heat-expandable sheet 7. The heat-expandable sheet 7 is a medium having an expansion layer, which expands according to the amount of absorbed heat, inside. A gradation image (an electromagnetic wave-heat conversion layer) is formed by carbon black on the rear surface of the heat-expandable sheet 7. If a portion where the gradation image is formed on the heat-expandable sheet 7 is irradiated with the visible light and near infrared light, the near infrared light is converted to heat in the portion, thereby generating heat. In response thereto, the expansion layer in the portion expands and rises and then a three-dimensional image is formed.

The light irradiation unit 4 includes a light irradiation control circuit 41, a cooling fan 42, a temperature sensor 43, a lamp heater 44, a reflective plate 441, a barcode reader 45, a mirror 451, a motor 48, insertion rollers 51 and 52, discharge rollers 53 and 54, and a room temperature sensor 49.

The light irradiation control circuit 41 is a control unit which controls the operations of the cooling fan 42, the lamp heater 44, the insertion rollers 51 and 52, and the discharge rollers 53 and 54. The light irradiation control circuit 41 includes a CPU and a memory, which are not shown, for example, and integrally controls the light irradiation unit 4 on the basis of an instruction from the computer 3. The light irradiation control circuit 41 controls the cooling fan 42 on the basis of input signals from the barcode reader 45, an inlet sensor 46, and an outlet sensor 47. Moreover, the light irradiation control circuit 41 controls the turning on and off of the lamp heater 44 on the basis of an input signal from the temperature sensor 43. Furthermore, the light irradiation control circuit 41 controls the rotation of the motor 48 which drives the insertion rollers 51 and 52 and the discharge rollers 53 and 54 on the basis of input signals from the barcode reader 45, the inlet sensor 46, and the outlet sensor 47. Incidentally, the light irradiation control circuit 41 has a function of changing the conveying speed of the heat-expandable sheet 7 according to arbitrary timing.

The cooling fan 42 is a cooling unit which air-cools the reflective plate 441. The temperature sensor 43 is a measuring unit which measures the temperature TH1 of the reflective plate 441 as a temperature of the surroundings of a heating unit described later. The lamp heater 44 is a member which generates visible light and near infrared light.

In this embodiment, description will be made assuming that the lamp heater 44 is formed of a halogen lamp. The reflective plate 441 is a member which reflects the visible light and near infrared light generated by the lamp heater 44. The reflective plate 441 has a shape to cover the back surface of the lamp heater 44 and is arranged on the back surface side of the lamp heater 44. The front side of the reflective plate 441 is mirror surface-like and functions as a reflective surface which reflects light. A temperature sensor 43 is attached to the back surface of the reflective plate 441.

The lamp heater 44 and the reflective plate 441 function as a heating unit which irradiates the heat-expandable sheet 7 with visible light and near infrared light to heat the portion where a gradation image (an electromagnetic wave-heat conversion layer) is formed on the heat-expandable sheet 7 with near infrared light.

In this embodiment, description will be made assuming that the heating unit (the lamp heater 44 and the reflective plate 441) is arranged above a conveyance path 6. Note that, however, the heating unit (the lamp heater 44 and the reflective plate 441) is also allowed to be arranged under the conveyance path 6.

The barcode reader 45 is a device which reads a barcode printed at the end part of the rear surface of the heat-expandable sheet 7.

When the rear surface of the heat-expandable sheet 7 is placed in a paper feed unit 50 so as to face upward, the mirror 451 reflects the barcode on the heat-expandable sheet 7 so that the barcode reader 45 is able to read the barcode.

The reading of the barcode by the barcode reader 45 enables the three-dimensional image forming system 1 to distinguish between the front surface and the rear surface of the heat-expandable sheet 7.

The motor 48 is a drive source for the insertion rollers 51 and 52 and the discharge rollers 53 and 54.

The insertion rollers 51 and 52 are conveying units arranged on the upstream side of the heating unit (the lamp heater 44 and the reflective plate 441).

The discharge rollers 53 and 54 are conveying units arranged on the downstream side of the heating unit (the lamp heater 44 and the reflective plate 441).

The room temperature sensor 49 is a measuring unit which measures the temperature TH2 of a room (room temperature) in which the three-dimensional image forming system 1 is installed.

In the inside of the light irradiation unit 4, the conveyance path 6 indicated by a dashed-dotted line is formed. The conveyance path 6 is formed from an insertion unit 5 into which the heat-expandable sheet 7 is inserted to a discharge unit (not shown) from which the heat-expandable sheet 7 is discharged. In the inside of the insertion unit 5, the paper feed unit 50 is arranged.

The light irradiation unit 4 includes the paper feed unit 50, the inlet sensor 46, the insertion rollers 51 and 52, a lower guide 55, an upper guide 56, the discharge rollers 53 and 54, and the outlet sensor 47 along the conveyance path 6.

The paper feed unit 50 is a portion which supplies the heating unit with the heat-expandable sheet 7.

When the heat-expandable sheet 7 is inserted from the insertion unit 5 into the inside and placed in the paper feed unit 50 and the touch panel display 2 instructs the light irradiation unit 4 to irradiate the heat-expandable sheet 7 with light, the light irradiation unit 4 starts the conveyance of the heat-expandable sheet 7 and the light irradiation thereof. This conveyance is started by a conveying mechanism not shown and included by the paper feed unit 50.

The inlet sensor 46 is a detection sensor which detects the heat-expandable sheet 7. The inlet sensor 46 detects that the front end of the heat-expandable sheet 7 has reached a position just before the insertion rollers 51 and 52 and that the rear end of the heat-expandable sheet 7 has passed through the position just before the insertion rollers 51 and 52.

The insertion rollers 51 and 52 are provided on both sides of the conveyance path 6, respectively, and hold the end part of the heat-expandable sheet 7 from the upper and lower sides for conveyance. These insertion rollers 51 and 52 are connected to the motor 48 via a power transmission mechanism not shown and driven by the motor 48.

The lower guide 55 and the upper guide 56 are guide members which guide the heat-expandable sheet 7 so as to be conveyed.

In this embodiment, the lower guide 55 and the upper guide 56, each of which has a long and flat plate shape, guide the heat-expandable sheet 7 from the lower and upper sides of the conveyance path 6.

The lower guide 55 has a shape in which the front end part and the rear end part are bent downward so as not to interfere with the conveyance of the heat-expandable sheet 7. The lower guide 55 is preferably made of robust metal material. Moreover, the upper guide 56 has a shape in which the front end part and the rear end part bent upward so as not to interfere with the conveyance of the heat-expandable sheet 7. The upper guide 56 is preferably made of transparent glass or plastic material or the like.

In this embodiment, the front end and the rear end of the lower guide 55 and the upper guide 56 are based on the heat-expandable sheet 7 which is a conveyance medium. In the shown example, the side closer to the discharge rollers 53 and 54 (specifically, the downstream side in the conveying direction) corresponds to the front end side of the lower guide 55 and the upper guide 56, and the side closer to the insertion rollers 51 and 52 (specifically, the upstream side in the conveying direction) corresponds to the rear end side of the lower guide 55 and the upper guide 56.

The discharge rollers 53 and 54 hold the heat-expandable sheet 7 from the upper and lower sides for conveyance. These discharge rollers 53 and 54 are also connected to the motor 48 via a power transmission mechanism not shown and driven by the motor 48.

Similarly to the inlet sensor 46, the outlet sensor 47 is a detection sensor for detecting the heat-expandable sheet 7. The outlet sensor 47 detects that the front end of the heat-expandable sheet 7 has reached the position just after the discharge rollers 53 and 54 and that the rear end of the heat-expandable sheet 7 has passed through the position just after the discharge rollers 53 and 54.

The mechanism of the inside of the light irradiation unit 4 is roughly classified into a heating region part HS for heating the heat-expandable sheet 7 just under the heating unit (the lamp heater 44 and the reflective plate 441), an upstream mechanism part US on the upstream side of the heating region part HS, and a downstream mechanism part LS on the downstream side of the heating region part HS.

In this embodiment, the upper guide 56 is formed of a plurality of long and plate-like members arranged side by side along the width direction of the conveyance path 6 (the direction perpendicular to the plane of paper of FIG. 1).

Each upper guides 56 is provided inclined in an oblique direction in a side view so as not to cast a strong shadow on the heat-expandable sheet 7 by the arrangement in parallel with the conveying direction.

Specifically, each upper guide 56 is arranged inclined so that the rear end is separated from the conveyance path 6 between the conveyance path 6 and the heating unit (the lamp heater 44 and the reflective plate 441).

Thereby, the upper guide 56 is apart from the heat-expandable sheet 7 by a predetermined distance just under the lamp heater 44 and therefore the upper guide 56 does not cast a strong shadow. Moreover, the upper guide 56 is provided inclined in an oblique direction in a top view so as not to cast a shadow in the same position of the heat-expandable sheet 7 by the arrangement in parallel with the conveying direction.

In addition, if the temperature sensor 43 casts a shadow on the heat-expandable sheet 7, the temperature sensor 43 decreases the conversion efficiency of an electromagnetic wave to heat in the portion where the shadow is cast.

Therefore, in this embodiment, the temperature sensor 43 is attached to the back surface of the reflective plate 441 so as not to cast the shadow of the temperature sensor 43 on the heat-expandable sheet 7.

The temperature of the front side of the reflective plate 441, however, tends to be higher than the temperature of the back surface of the reflective plate 441. In addition, the temperature of the front side of the reflective plate 441 greatly differs from the temperature of the back surface of the reflective plate 441 in some cases.

Thereby, the temperature in the irradiation direction of light radiated from the heating unit sometimes greatly differs from the measured temperature TH1 of the back surface of the reflective plate 441 measured by the temperature sensor 43.

This phenomenon that the temperature of the front side of the reflective plate 441 greatly differs from the temperature of the back surface of the reflective plate 441 easily occurs particularly when the temperature increases. Therefore, the three-dimensional image forming system 1 forms a three-dimensional image in a method described in the following chapter titled, "Operation of Three-dimensional Image Forming System" in order to eliminate the influence of the phenomenon.

(Operation of Three-Dimensional Image Forming System)

Hereinafter, a description will be made on the operation of the three-dimensional image forming system 1 with reference to FIGS. 2A, 2B, and 3.

Figure 2A:
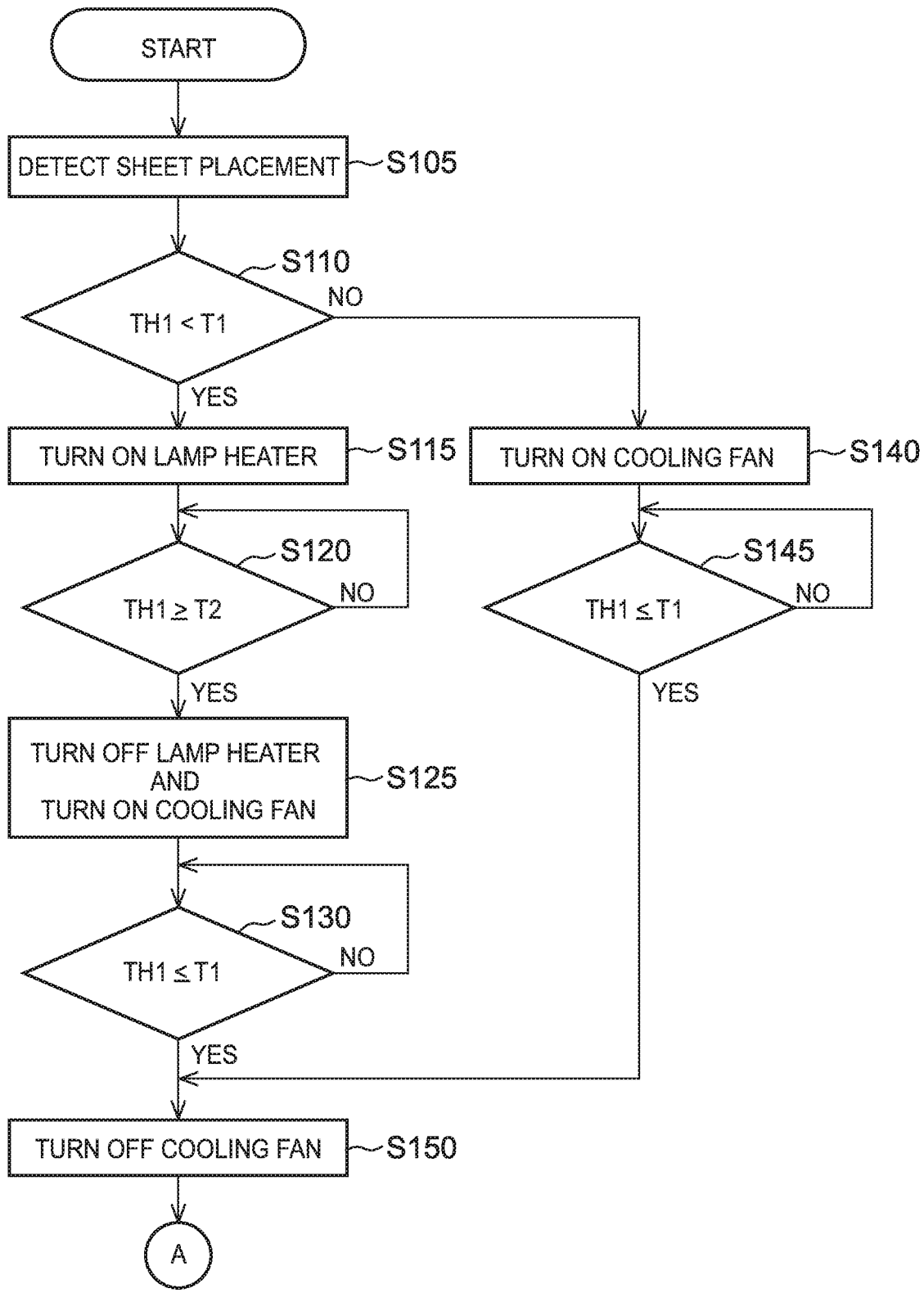
FIG. 2A is a flowchart (1) showing the operation of the three-dimensional image forming system according to the embodiment.
Figure 2B:
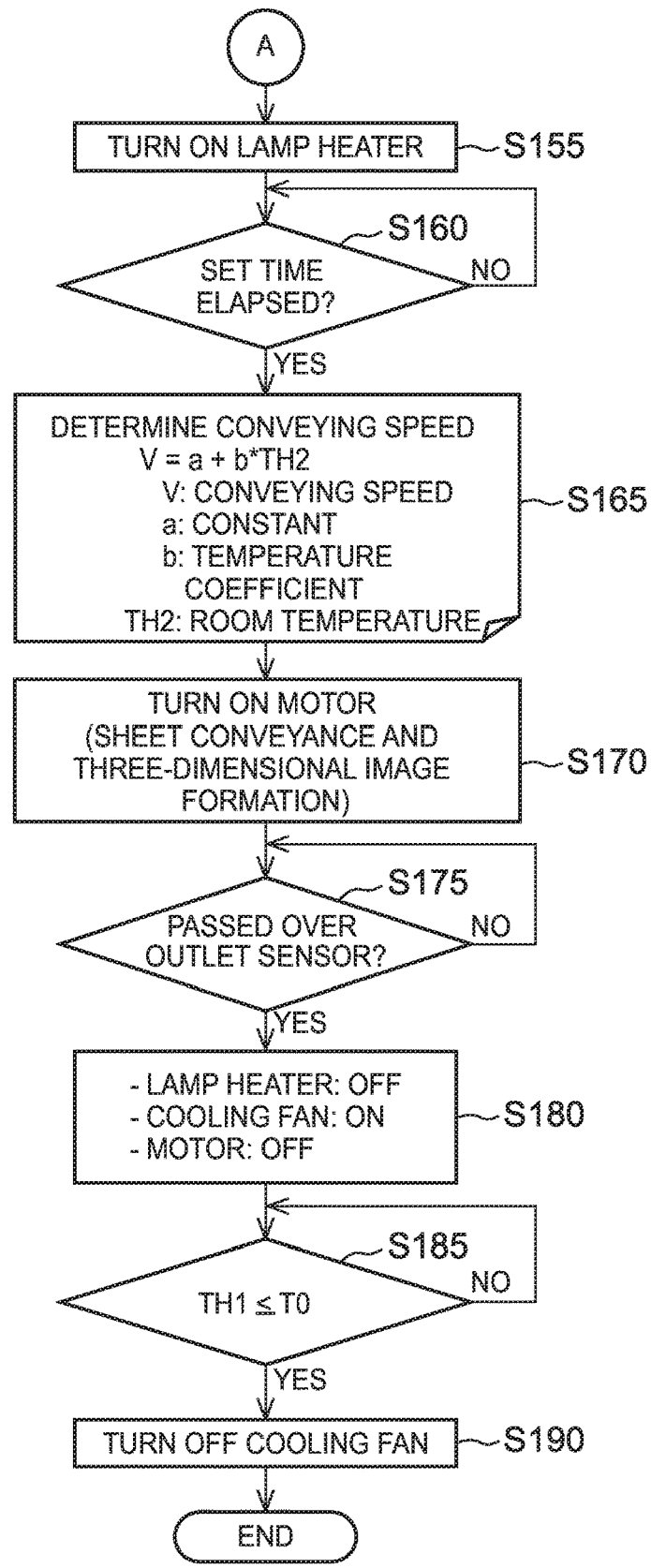
FIG. 2B is a flowchart (2) showing the operation of the three-dimensional image forming system according to the embodiment.

FIGS. 2A and 2B are flowcharts each showing the operation of the three-dimensional image forming system 1.

Figure 3:
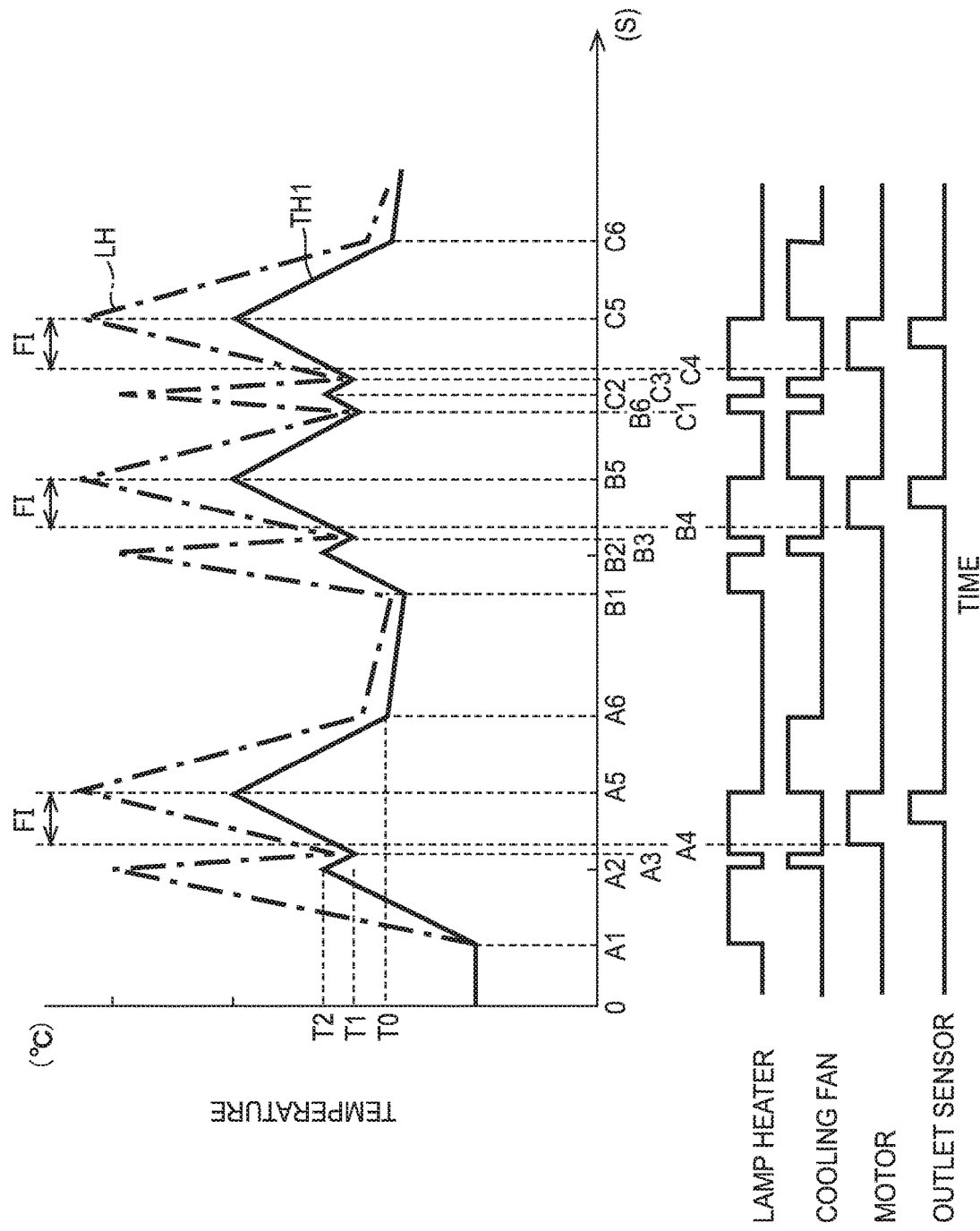
FIG. 3 is a sequence diagram showing an operation example of the three-dimensional image forming system according to the embodiment.

FIG. 3 is a sequence diagram showing an operation example of the three-dimensional image forming system 1.

FIG. 3 shows a graph of temperature controls of the three-dimensional image forming system 1 on the upper side and shows a sequence example of the on/off states of the lamp heater 44, the cooling fan 42, the motor 48, and the outlet sensor 47 on the lower side. In the graph of FIG. 3, the horizontal axis represents time (s) and the vertical axis represents temperature (° C.). In the graph of FIG. 3, a dashed-dotted line indicates a temperature LH of the front side of the reflective plate 441 (specifically, the temperature in the light irradiation direction) and a solid line indicates a measured temperature TH1 of the back surface of the reflective plate 441.

As apparent from FIG. 3, the temperature LH of the front side of the reflective plate 441 indicated by the dashed-dotted line is likely to have a value greatly different from the measured temperature TH1 of the back surface of the reflective plate 441 indicated by the solid line when the temperature increases. The temperature LH of the front side of the reflective plate 441 indicated by the dashed-dotted line, however, has a value approximate to the measured temperature TH1 of the back surface of the reflective plate 441 indicated by the solid line when the temperature decreases.

Accordingly, the three-dimensional image forming system 1 is configured to preheat the surroundings of the heating unit (the lamp heater 44 and the reflective plate 441) to a previously determined preheat temperature T1 (see FIG. 3) in the formation of a three-dimensional image and then to cause the conveying unit (the insertion rollers 51 and 52 and the discharge rollers 53 and 54) to convey the heat-expandable sheet 7.

In this embodiment, the light irradiation control circuit 41 functions as an optical heating control unit which controls the operation of the heating unit (the lamp heater 44 and the reflective plate 441) and as a conveyance control unit which controls the operation of the conveying unit (the insertion rollers 51 and 52 and the discharge rollers 53 and 54).

Furthermore, the three-dimensional image forming system 1 operates on the basis of the time measured by a timer not shown. Moreover, the operation of the three-dimensional image forming system 1 is specified by a program which is previously stored in a storage unit not shown in the light irradiation control circuit 41 in a freely readable state.

Since these issues are common parts in information processing, the detailed description thereof will be omitted hereinafter.

The three-dimensional image forming system 1 starts the operation in response to actions taken by an operator, i.e. inserting the heat-expandable sheet 7 (paper) from the insertion unit 5 and placing it in the paper feed unit 50 and then depressing (tapping) a start button (not shown) displayed on the touch panel display 2.

As shown in FIG. 2A, the light irradiation control circuit 41 of the three-dimensional image forming system 1 detects the insertion of the heat-expandable sheet 7 by using the barcode reader 45 (step S105). At this point of time, the light irradiation control circuit 41 distinguishes between the front surface and the rear surface of the heat-expandable sheet 7 on the basis of an output signal from the barcode reader 45.

Thereafter, if the heat-expandable sheet 7 is placed in such a way that the rear surface thereof faces upward, the light irradiation control circuit 41 determines whether or not the measured temperature TH1 of the back surface of the reflective plate 441 measured by the temperature sensor 43 is lower than the preheat temperature T1 (see FIG. 3) (step S110).

The preheat temperature T1 is a temperature previously determined to preheat the surroundings of the heating unit (the lamp heater 44 and the reflective plate 441).

If it is determined that the measured temperature TH1 of the back surface of the reflective plate 441 is lower than the preheat temperature T1 in the determination of step S110 (in the case of Yes), the light irradiation control circuit 41 starts the light irradiation by turning on the lamp heater 44 to increase the measured temperature TH1 (step S115).

Thereby, the temperature of the surroundings of the heating unit (the lamp heater 44 and the reflective plate 441) increases.

In the example shown in FIG. 3, for example, the three-dimensional image forming system 1 starts the light irradiation at time A1. Thereafter, the time progresses from the time A1 to time A2, by which the temperature LH of the front side of the reflective plate 441 and the measured temperature TH1 of the back surface of the reflective plate 441 increase. At this point of time, the value of the temperature LH of the front side of the reflective plate 441 is greatly different from the value of the measured temperature TH1 of the back surface of the reflective plate 441. Specifically, the temperature LH of the front side of the reflective plate 441 is relatively larger than the measured temperature TH1 of the back surface of the reflective plate 441.

Thereafter, the light irradiation control circuit 41 determines whether or not the measured temperature TH1 of the back surface of the reflective plate 441 has increased to be equal to or higher than the heating temperature T2 (see FIG. 3) (step S120). The heating temperature T2 is previously set to a value higher than the preheat temperature T1 (see FIG. 3).

If it is determined that the measured temperature TH1 of the back surface of the reflective plate 441 has increased to be equal to or higher than the heating temperature T2 (see FIG. 3) in the determination of step S120 (in the case of Yes), the light irradiation control circuit 41 performs the following control.

Specifically, the light irradiation control circuit 41 stops the light irradiation by turning off the lamp heater 44 and starts blowing to the heating unit (the lamp heater 44 and the reflective plate 441) by turning on the cooling fan 42 (step S125).

Thereby, the light irradiation control circuit 41 lowers the measured temperature TH1 of the back surface of the reflective plate 441. Accordingly, the temperature of the surroundings of the heating unit (the lamp heater 44 and the reflective plate 441) decreases.

In the example shown in FIG. 3, for example, the temperature LH of the front side of the reflective plate 441 and the measured temperature TH1 of the back surface of the reflective plate 441 decrease as time elapses from the time A2 to time A3.

At this point of time, the value of the temperature LH of the front side of the reflective plate 441 is approximate to the value of the measured temperature TH1 of the back surface of the reflective plate 441. Specifically, the value of the temperature LH of the front side of the reflective plate 441 is slightly higher than the value of the measured temperature TH1 of the back surface of the reflective plate 441.

Thereafter, the light irradiation control circuit 41 determines whether or not the measured temperature TH1 of the back surface of the reflective plate 441 has decreased to be equal to or lower than the preheat temperature T1 (see FIG. 3) (step S130).

If it is determined that the measured temperature TH1 of the back surface of the reflective plate 441 has decreased to be equal to or lower than the preheat temperature T1 (see FIG. 3) (in the case of Yes), the light irradiation control circuit 41 stops the blowing to the heating unit (the lamp heater 44 and the reflective plate 441) by turning off the cooling fan 42 (step S150). Thereafter, the processing proceeds to step S155 (see FIG. 2B).

On the other hand, unless it is determined that the measured temperature TH1 of the back surface of the reflective plate 441 is lower than the preheat temperature T1

(in other words, if the measured temperature TH1 is equal to or higher than the preheating temperature T1) (in the case of No) in the determination of step S110, the light irradiation control circuit 41 performs the following control.

Specifically, the light irradiation control circuit 41 starts blowing to the heating unit (the lamp heater 44 and the reflective plate 441) by turning on the cooling fan 42 (step S140). Thereby, the light irradiation control circuit 41 lowers the measured temperature TH1 of the back surface of the reflective plate 441. Thereby, the temperature of the surroundings of the heating unit (the lamp heater 44 and the reflective plate 441) decreases.

Thereafter, the light irradiation control circuit 41 determines whether or not the measured temperature TH1 of the back surface of the reflective plate 441 has decreased to be equal to or lower than the preheat temperature T1 (see FIG. 3) (step S145).

If it is determined that the measured temperature TH1 of the back surface of the reflective plate 441 has decreased to be equal to or lower than the preheat temperature T1 (see FIG. 3) (in the case of Yes), the processing proceeds to step S150.

Thereby, the light irradiation control circuit 41 stops the blowing to the heating unit (the lamp heater 44 and the reflective plate 441) by turning off the cooling fan 42 in step S150.

As shown in FIG. 2B, the light irradiation control circuit 41 starts the light irradiation by turning on the lamp heater 44 to form a three-dimensional image on the heat-expandable sheet 7 after step S150 (step S155).

Then, the light irradiation control circuit 41 waits until a previously determined set time elapses (step S160). Thereby, in the example shown in FIG. 3, for example, time progresses from the time A3 to time A4.

This set time is intended to be used to increase the measured temperature TH1 of the back surface of the reflective plate 441 up to a formation temperature at which the expansion layer (not shown) of the heat-expandable sheet 7 is able to be expanded.

In addition, the time A4 shown in FIG. 3 is time when the measured temperature TH1 of the back surface of the reflective plate 441 has reached the formation temperature. The time A4 is time for starting the formation of the three-dimensional image.

After an elapse of the set time, the light irradiation control circuit 41 determines the conveying speed of the heat-expandable sheet 7 on the basis of the following equation (1) (step S165).

$$V=a+b\times TH2 \quad (1)$$

where the meanings of the above symbols are as follows:
V: Conveying speed
a: Constant
b: Temperature coefficient
TH2: Room temperature The constant a and the temperature coefficient b can be obtained by performing an experiment of three-dimensional image formation while varying the room temperature beforehand. The room temperature TH2 can be obtained by measuring the room temperature by using the room temperature sensor 49 when a three-dimensional image is formed.

The reason for determining the conveying speed V is that the change in the conveying speed V depending on the room temperature offsets the change in the intensity of near infrared light as described below.

Specifically, the intensity of near infrared light radiated in forming a three-dimensional image varies according to the room temperature. Therefore, the expansion height of the three-dimensional image changes significantly depending on the room temperature.

Therefore, in this embodiment, the three-dimensional image forming system 1 changes the conveying speed V depending on the room temperature to offset the change in the intensity of near infrared light.

This type of three-dimensional image forming system 1 is able to stably form a three-dimensional image having a desired expansion height even if the room temperature changes.

The process of step S165 may be performed either in parallel with the process of step S160 or before the process of step S160.

Thereafter, the light irradiation control circuit 41 turns on the motor 48 (step S170). At this point of time, the heat-expandable sheet 7 is sent out from the paper feed unit 50 and conveyed toward the downstream side at the conveying speed V determined in step S165 by the conveying unit (the insertion rollers 51 and 52 and the discharge rollers 53 and 54).

Thereby, the tip part of the heat-expandable sheet 7 passes over the inlet sensor 46 and then enters the heating region part HS from the upstream mechanism part US.

At this time, in the heating region part HS, the rear surface of the heat-expandable sheet 7 is irradiated with visible light and near infrared light, by which a three-dimensional image is formed on the heat-expandable sheet 7.

In the example shown in FIG. 3, a period FI represents a three-dimensional image forming period during which a three-dimensional image is formed.

In the example shown in FIG. 3, for example, a three-dimensional image starts to be formed at the time A4 which is the start time of the period FI.

Thereafter, the three-dimensional image is formed until it is detected that the rear end of the heat-expandable sheet 7 has passed over the outlet sensor 47 at time A5, which is the end time of the period FI.

Then, if it is detected that the rear end of the heat-expandable sheet 7 has passed over the outlet sensor 47 at the time A5, the formation of the three-dimensional image ends. Hereinafter, the temperature at the formation of the three-dimensional image at the time A5 or the like will be referred to as "formation temperature."

The light irradiation control circuit 41 monitors whether or not the rear end of the heat-expandable sheet 7 has passed over the outlet sensor 47 (step S175). If the rear end of the heat-expandable sheet 7 has passed over the outlet sensor 47 (in the case of Yes), the light irradiation control circuit 41 performs the following control.

Specifically, the light irradiation control circuit 41 stops the light irradiation by turning off the lamp heater 44 and starts blowing to the heating unit (the lamp heater 44 and the reflective plate 441) by turning on the cooling fan 42.

Furthermore, the light irradiation control circuit 41 stops the conveyance of the heat-expandable sheet 7 by turning off the motor 48 (step S180). Thereby, the temperature of the surroundings of the heating unit (the lamp heater 44 and the reflective plate 441) decreases. In addition, the heat-expandable sheet 7 is discharged to a discharge unit (not shown) of the light irradiation unit 4.

Thereafter, the light irradiation control circuit 41 determines whether or not the measured temperature TH1 of the back surface of the reflective plate 441 has decreased to be equal to or lower than a previously determined end temperature T0 (see FIG. 3) from the formation temperature (the temperature obtained at the formation of the three-dimensional image at the time A5 or the like) (step S185).

The end temperature T0 (see FIG. 3) is previously determined to end a series of routine processes (three-dimensional image forming processing).

If it is determined that the measured temperature TH1 of the back surface of the reflective plate 441 has decreased to be equal to or lower than the end temperature T0 (see FIG. 3) (in the case of Yes) in the determination of step S185, the light irradiation control circuit 41 stops the blowing to the heating unit (the lamp heater 44 and the reflective plate 441) by turning off the cooling fan 42 (step S190).

Thereby, the series of routine processes (three-dimensional image forming processing) ends.

In the example shown in FIG. 3, the measured temperature TH1 of the back surface of the reflective plate 441 decreases to the end temperature T0 at time A6. Therefore, the light irradiation control circuit 41 stops the blowing to the heating unit (the lamp heater 44 and the reflective plate 441) by turning off the cooling fan 42 at the time A6.

Thereby, the temperature LH of the front side of the reflective plate 441 and the measured temperature TH1 of the back surface of the reflective plate 441 slowly decrease at the time A6 and after.

Then, at the time A6 and after, the heat-expandable sheet 7 is placed in the paper feed unit 50 again and the touch panel display 2 gives an instruction of light irradiation. In response to the instruction, the three-dimensional image forming system 1 restarts the formation of the three-dimensional image. Accordingly, the three-dimensional image forming system 1 performs the same processing as that performed from the time A1 to the time A6 described above in a period of time B1 to time B6.

In performing the processing, the heat-expandable sheet 7 is placed in the paper feed unit 50 again and the touch panel display 2 gives an instruction of light irradiation before the measured temperature TH1 of the back surface of the reflective plate 441 decreases to the end temperature T0 in the period of the time B5 to the time B6.

In response thereto, the three-dimensional image forming system 1 continuously forms the next three-dimensional image without ending the three-dimensional image formation. Thereby, the three-dimensional image forming system 1 performs the same processing as that performed from the time A1 to the time A6 described above in a period of time C1 to time C6.

It should be noted, however, that the time B6 is the same as the time C1. In addition, the period of the time C1 to the time C2 is shorter than the period of the time B1 to the time B2 during which the previous three-dimensional image is formed.

The heat-expandable sheet 7 can be conveyed repeatedly in the light irradiation unit 4. Thereby, the three-dimensional image forming system 1 is able to repeatedly perform the routine processing shown in FIGS. 2A and 2B for the heat-expandable sheet 7.

Figure 4:
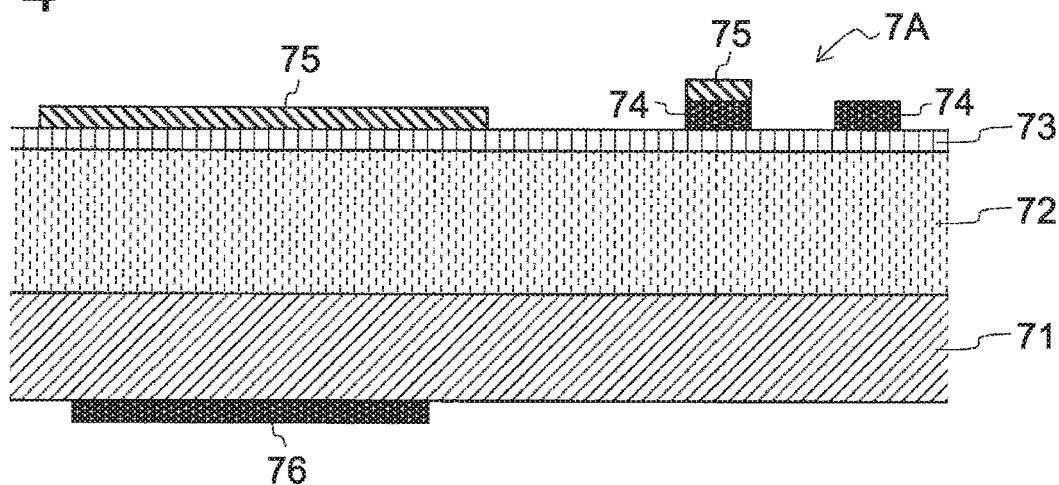
FIG. 4 is a sectional view showing a cross-sectional shape of a heat-expandable sheet before conveyance.
Figure 5:
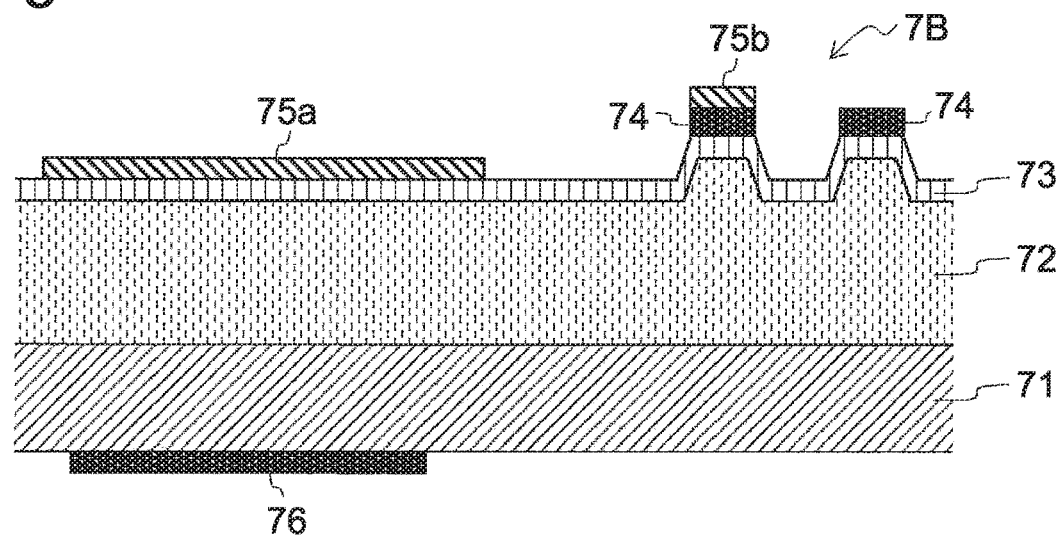
FIG. 5 is a sectional view showing a cross-sectional shape of the heat-expandable sheet after first conveyance.
Figure 6:
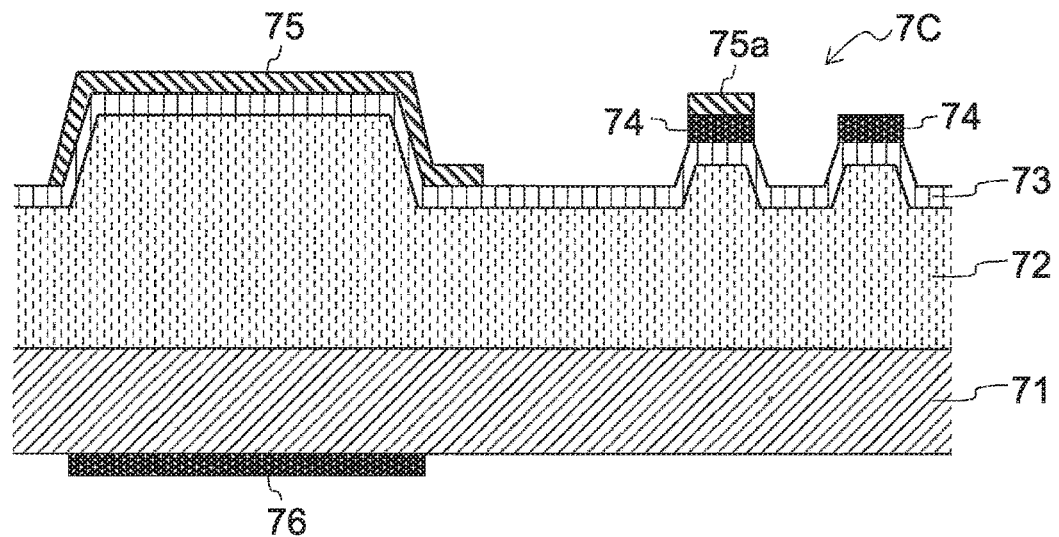
FIG. 6 is a sectional view showing a cross-sectional shape of the heat-expandable sheet after second conveyance.

With the above conveyance, the cross-sectional shape of the heat-expandable sheet 7 changes like the heat-expandable sheets 7A, 7B, and 7C shown in FIGS. 4 to 6, for example. FIGS. 4 to 6 show a change in the cross-sectional shape of the heat-expandable sheet 7 in the case where the heat-expandable sheet 7 is conveyed twice and the routine processing shown in FIGS. 2A and 2B is performed twice as processing for the front surface and the rear surface.

FIG. 4 is a sectional view showing a cross-sectional shape of the heat-expandable sheet 7A before conveyance.

On the heat-expandable sheet 7A shown in FIG. 4, a base material 71, a foamed resin layer (an expansion layer) 72, and an ink receiving layer 73 are sequentially stacked.

The base material 71 is made of paper, canvas or other cloth, plastic or other panel material, or the like and its material type is not particularly limited.

In the foamed resin layer (the expansion layer) 72, a heat foaming agent (heat-expandable microcapsule) is arranged at dispersed locations in binder which is a thermoplastic resin provided on the base material 71. Thereby, the foamed resin layer (the expansion layer) 72 foams and expands according to the amount of absorbed heat.

The ink receiving layer 73 is formed with a thickness of 10 μm, for example, so as to cover the whole top surface of the foamed resin layer (the expansion layer) 72. The ink receiving layer 73 is made of material suitable for receiving printing ink for use in an inkjet type printer, printing toner for use in a laser type printer, ink for a ballpoint pen or a fountain pen, graphite for a pencil, or the like and then fixing the received ink or the like to the surface.

Regarding the heat-expandable sheet 7A, further an electromagnetic wave-heat conversion layer 74 and color ink layers 75a and 75b are printed on the front surface (the ink receiving layer 73 side) and an electromagnetic wave-heat conversion layer 76 is printed on the rear surface (the base material 71 side). The electromagnetic wave-heat conversion layers 74 and 76 are layers printed in ink including a carbon black, for example, and are used to convert visible light and near infrared light (electromagnetic wave) to heat. In addition, the color ink layers 75a and 75b are merely examples of an image layer printed in ink of cyan, magenta, yellow or other colors.

The heat-expandable sheet 7A is in a state before the foamed resin layer (the expansion layer) 72 is expanded by heating, and therefore the thickness of the foamed resin layer (the expansion layer) 72 is uniform.

The heat-expandable sheet 7A is placed, with the ink receiving layer 73 facing up, in the paper feed unit 50 of the light irradiation unit 4, where the electromagnetic wave-heat conversion layer 74 is printed on the ink receiving layer 73, as shown in FIG. 1.

Thereafter, the heat-expandable sheet 7A is irradiated with visible light and near infrared light (electromagnetic wave) on the conveyance path 6, by which the foamed resin layer (the expansion layer) 72 is expanded by heating and the heat-expandable sheet 7B shown in FIG. 5 is formed.

FIG. 5 is a sectional view showing a cross-sectional shape of the heat-expandable sheet 7B after first conveyance.

The electromagnetic wave-heat conversion layer 74 is irradiated with light from the upper side of the diagram and converts the light to heat in the first conveyance.

The electromagnetic wave-heat conversion layer 74 is provided to form a fine stereoscopic pattern on a heat-expandable sheet 7.

The foamed resin layer (the expansion layer) 72 just under the electromagnetic wave-heat conversion layer 74 is exposed to heat and thereby foams and expands.

The ink receiving layer 73, the electromagnetic wave-heat conversion layer 74, and the color ink layer 75b each have stretchability and deform following the foaming and expansion of the foamed resin layer (the expansion layer) 72. In this manner, the heat-expandable sheet 7B is formed.

If a gap occurs between these layers, it could lead to a reduction in the quantity of heat conduction from the electromagnetic wave-heat conversion layer 74 to the foamed resin layer (the expansion layer) 72.

This heat-expandable sheet 7B is further placed with the base material 71 facing up in the paper feed unit 50 of the light irradiation unit 4, where the electromagnetic wave-heat conversion layer 76 is printed on the base material 71, and thereafter the heat-expandable sheet 7B is irradiated with visible light and near infrared light (electromagnetic wave) on the conveyance path 6, by which the foamed resin layer (the expansion layer) 72 is expanded by heating and then the heat-expandable sheet 7C shown in FIG. 6 is formed. The paper moisture of the heat-expandable sheet 7B is less than that of the heat-expandable sheet 7A due to the first heating. In the second heating of the heat-expandable sheet 7B, the conveying speed in the heating is increased due to anticipation of the decrease in moisture. Furthermore, the conveying speed in the second heating is varied depending on the elapsed time from the end of the first heating to the second heating.

FIG. 6 is a sectional view showing a cross-sectional shape of the heat-expandable sheet 7C after the second conveyance.

The electromagnetic wave-heat conversion layer 76 is irradiated with light from the lower side of the diagram and converts the light to heat in the second conveyance.

The electromagnetic wave-heat conversion layer 76 is provided to form a coarse stereoscopic pattern.

The foamed resin layer (the expansion layer) 72 located near the electromagnetic wave-heat conversion layer 76 is exposed to heat and thereby foams and expands. The ink receiving layer 73, the electromagnetic wave-heat conversion layer 74, and the color ink layer 75a each have stretchability and deform following the foaming and expansion of the foamed resin layer (the expansion layer) 72. In this manner, the heat-expandable sheet 7C including a three-dimensional image is formed.

(Main Characteristics of Three-dimensional Image Forming System)

In this configuration, the three-dimensional image forming system 1 according to this embodiment has the characteristics described below.

(1) The light irradiation control circuit 41 of the three-dimensional image forming system 1 causes the conveying unit to convey the heat-expandable sheet 7 after the preheating of the surroundings of the heating unit to a previously determined preheat temperature T1 (see FIG. 3) when forming a three-dimensional image.

This type of three-dimensional image forming system 1 is able to form a three-dimensional image on the basis of the preheat temperature T1 (see FIG. 3) and therefore is able to stably form a three-dimensional image having a desired expansion height.

(2) The light irradiation control circuit 41 of the three-dimensional image forming system 1 increases the temperature of the surroundings of the heating unit to a heating temperature T2 (see FIG. 3) higher than the preheat temperature T1 (see FIG. 3) and then decreases it to the preheat temperature T1 and thereafter causes the conveying unit to convey the heat-expandable sheet 7.

Thereby, the three-dimensional image forming system 1 is able to control the temperature of the front side of the reflective plate 441 to a desired temperature. This enables the three-dimensional image forming system 1 to stably form a three-dimensional image having a desired expansion height.

(3) In the formation of a three-dimensional image, the light irradiation control circuit 41 of the three-dimensional image forming system 1 conveys the heat-expandable sheet 7 at the conveying speed V depending on the room temperature TH2 measured by the room temperature sensor 49 immediately before starting the conveyance of the heat-expandable sheet 7 to form a three-dimensional image.

This type of three-dimensional image forming system 1 is able to stably form a three-dimensional image having a desired expansion height, even if the room temperature is not constant in the environment, in other words, without being affected by a change in the environmental temperature (room temperature TH2).

(4) The light irradiation control circuit 41 of the three-dimensional image forming system 1 performs the preheating control of the lamp heater 44 and then conveys the heat-expandable sheet 7 at the conveying speed V depending on the room temperature TH2 measured by the room temperature sensor 49 to form a three-dimensional image also in an intermittent insertion (the processing from the time A1 to the time A6 shown in FIG. 3) of the heat-expandable sheet 7 or a continuous insertion (the processing from the time B1 to the time C6 shown in FIG. 3).

This type of three-dimensional image forming system 1 is able to stably form a three-dimensional image having a desired expansion height, regardless of whether the intermittent insertion (the processing from the time A1 to the time A6 shown in FIG. 3) or the continuous insertion (the processing from the time B1 to the time C6 shown in FIG. 3) is applied, even if a change occurs in the environmental temperature (the room temperature TH2) affecting the expansion height of the three-dimensional image.

(5) The three-dimensional image forming system 1 detects that the temperature of the surroundings of the heating unit is a sufficiently low temperature without remaining preheat generated in the formation of the previous three-dimensional image and thereafter forms the next three-dimensional image.

This type of three-dimensional image forming system 1 is able to stably form a three-dimensional image having a desired expansion height, without being affected by the state of the three-dimensional image forming system 1.

Note that the aforementioned "sufficiently low temperature" means the temperature at the time C1 in performing the continuous insertion (the processing from the time B1 to the time C6 shown in FIG. 3), for example. The three-dimensional image forming system 1 is able to form the next three-dimensional image as long as the temperature is equal to or lower than the temperature at the time C1.

As described hereinabove, according to the three-dimensional image forming system 1 of this embodiment, a three-dimensional image having a desired expansion height can be formed stably.

The present invention is not limited to the above embodiments, and various modifications and variations may be made without departing from the spirit and scope of the present invention.

For example, the above embodiments have been described in detail for better understanding of the spirit and scope of the present invention. Therefore, the present invention is not always limited to the structure having all constituent elements described above.

Furthermore, a constituent element may be added to another constituent element or some constituent elements may be changed to other constituent elements in the present invention. Moreover, several constituent elements may be omitted in the present invention.

Moreover, the three-dimensional image forming system 1 is also able to form a three-dimensional image on both surfaces of the heat-expandable sheet 7 by irradiating the both surfaces of the heat-expandable sheet 7 with near infrared light, for example. In this case, the operation of the three-dimensional image forming system 1 shown in FIGS. 2A and 2B and the conveying speed or the like of the equation (1) described above may be changed according to the situation.

What is claimed is:

1. A three-dimensional image forming system comprising:
a conveyance path along which a heat-expandable sheet is conveyable;
a heater which heats the heat-expandable sheet by irradiating the heat-expandable sheet with light; and
a computer comprising a processor and a memory, the computer being configured to:
perform control to increase a temperature of surroundings of the heater to a heating temperature higher than a predetermined preheat temperature, and then to decrease the temperature of the surroundings of the heater to the preheat temperature, and thereafter, perform control to cause the heat-expandable sheet to be conveyed along the conveyance path;
perform control to form a three-dimensional image by causing the heat-expandable sheet to be conveyed and causing the heater to perform light irradiation; and
upon completion of the formation of the three-dimensional image, perform control to cause the heater to stop the light irradiation to decrease the temperature of the surroundings of the heater which has increased to a formation temperature higher than the preheat temperature by the light irradiation during the formation of the three-dimensional image,
wherein, in response to placement of a next heat-expandable sheet being detected before the temperature of the surroundings of the heater decreases to a predetermined end temperature lower than the preheat temperature, formation of a next three-dimensional image is continuously performed.

2. The three-dimensional image forming system according to claim 1, further comprising a temperature sensor which measures the temperature of the surroundings of the heater,
wherein the computer is configured to perform the control to increase the temperature of the surroundings of the heater to the heating temperature, and then to decrease the temperature of the surroundings of the heater to the preheat temperature, based on the temperature of the surroundings of the heater measured by the temperature sensor.

3. The three-dimensional image forming system according to claim 1, wherein, in response to the placement of the next heat-expandable sheet being detected after the temperature of the surroundings of the heater decreases to the end temperature, the computer is configured to perform control to temporarily end the formation of the three-dimensional image, increase the temperature of the surroundings of the heater to the heating temperature and then decrease the temperature of the surroundings of the heater to the preheat temperature, and thereafter, cause the heat-expandable sheet to be conveyed to restart the formation of the three-dimensional image.

4. The three-dimensional image forming system according to claim 2, wherein:
a reflective plate which reflects light is arranged on a back surface side of the heater; and
the temperature sensor is arranged on the back surface of the reflective plate.

5. The three-dimensional image forming system according to claim 1, further comprising a fan which blows to the heater,
wherein the computer is configured to control the blowing by the fan before causing the heat-expandable sheet to be conveyed to cool down the surroundings of the heater to a predetermined temperature.

6. The three-dimensional image forming system according to claim 1, further comprising a room temperature sensor which measures a room temperature,
wherein the computer is configured to perform control to determine a conveying speed of the heat-expandable sheet according to the room temperature measured by the room temperature sensor.

7. A three-dimensional image forming device comprising:
a conveyance path along which a heat-expandable sheet is conveyable;
a heater which heats the heat-expandable sheet by irradiating the heat-expandable sheet with light; and
a computer comprising a processor and a memory, the computer being configured to:
perform control to increase a temperature of surroundings of the heater to a heating temperature higher than a predetermined preheat temperature, and then to decrease the temperature of the surroundings of the heater to the preheat temperature, and thereafter, perform control to cause the heat-expandable sheet to be conveyed along the conveyance path;
perform control to form a three-dimensional image by causing the heat-expandable sheet to be conveyed and causing the heater to perform light irradiation; and
upon completion of the formation of the three-dimensional image, perform control to cause the heater to stop the light irradiation to decrease the temperature of the surroundings of the heater which has increased to a formation temperature higher than the preheat temperature by the light irradiation during the formation of the three-dimensional image,
wherein, in response to placement of a next heat-expandable sheet being detected before the temperature of the surroundings of the heater decreases to a predetermined end temperature lower than the preheat temperature, formation of a next three-dimensional image is continuously performed.

8. The three-dimensional image forming device according to claim 7, further comprising a temperature sensor which measures the temperature of the surroundings of the heater,
wherein the computer is configured to perform the control to increase the temperature of the surroundings of the heater to the heating temperature, and then to decrease the temperature of the surroundings of the heater to the preheat temperature, based on the temperature of the surroundings of the heater measured by the temperature sensor.

9. The three-dimensional image forming device according to claim 7, wherein, in response to the placement of the next heat-expandable sheet being detected after the temperature of the surroundings of the heater decreases to the end temperature, the computer is configured to perform control to temporarily end the formation of the three-dimensional image, increase the temperature of the surroundings of the heater to the heating temperature and then decrease the temperature of the surroundings of the heater to the preheat temperature, and thereafter, cause the heat-expandable sheet to be conveyed to restart the formation of the three-dimensional image.

10. The three-dimensional image forming device according to claim 8, wherein:
   a reflective plate which reflects light is arranged on a back surface side of the heater; and
   the temperature sensor is arranged on the back surface of the reflective plate.

11. The three-dimensional image forming device according to claim 7, further comprising a fan which blows to the heater,
   wherein the computer is configured to control the blowing by the fan before causing the heat-expandable sheet to be conveyed to cool down the surroundings of the heater to a predetermined temperature.

12. The three-dimensional image forming device according to claim 7, further comprising a room temperature sensor which measures a room temperature,
   wherein the computer is configured to perform control to determine a conveying speed of the heat-expandable sheet according to the room temperature measured by the room temperature sensor.

\* \* \* \* \*